(12) United States Patent
Mayers

(10) Patent No.: US 8,972,749 B2
(45) Date of Patent: Mar. 3, 2015

(54) METHOD AND APPARATUS FOR SECURELY STORING DATA IN A DATABASE

(71) Applicant: Rodney E. Mayers, Westbury, NY (US)

(72) Inventor: Rodney E. Mayers, Westbury, NY (US)

( * ) Notice: Subject to any disclaimer, the term of this patent is extended or adjusted under 35 U.S.C. 154(b) by 146 days.

(21) Appl. No.: 13/708,417

(22) Filed: Dec. 7, 2012

(65) Prior Publication Data

US 2014/0164783 A1    Jun. 12, 2014

(51) Int. Cl.
*G06F 11/30* (2006.01)
*G06F 21/00* (2013.01)
*G06F 21/62* (2013.01)

(52) U.S. Cl.
CPC ............... *G06F 21/00* (2013.01); *G06F 21/62* (2013.01); *G06F 21/6209* (2013.01); *G06F 2221/2107* (2013.01)
USPC ........................................................ 713/189

(58) Field of Classification Search
CPC . H04L 63/0428; H04L 63/08; G06F 21/6209; G06F 21/602; G06F 21/72; G06F 21/10; G06F 2221/2107
See application file for complete search history.

(56) References Cited

U.S. PATENT DOCUMENTS

| | | | |
|---|---|---|---|
| 6,373,947 B1 * | 4/2002 | Pomerantz et al. | 380/212 |
| 6,434,702 B1 * | 8/2002 | Maddalozzo et al. | 726/17 |
| 2011/0307714 A1 * | 12/2011 | Comrie et al. | 713/189 |
| 2014/0067688 A1 * | 3/2014 | Oberberger et al. | 705/71 |

OTHER PUBLICATIONS

Elian, C.C., "Full Structure of the Elian Script", 2008, http://www.ccelian.com/ElianScript.pdf.*

* cited by examiner

*Primary Examiner* — Eleni Shiferaw
*Assistant Examiner* — Gregory M Elmore
(74) *Attorney, Agent, or Firm* — The Farrell Law Firm, P.C.

(57) ABSTRACT

A method of securely storing data in a memory on a computer including a processor is provided. The method includes receiving unencrypted data; randomly selecting a key, wherein the key is a character of an alphabet of a data type of the unencrypted data; creating partially encrypted data by encrypting the unencrypted data by randomly mapping each character of the alphabet of the data type of the unencrypted data to a character of an alphabet of a data type of encrypted data, except each character of the unencrypted data matching the key is not encrypted; and storing the partially encrypted data in the memory.

11 Claims, 4 Drawing Sheets

METHOD AND APPARATUS FOR SECURELY STORING DATA IN A DATABASE

BACKGROUND OF THE INVENTION

1. Field of the Invention

The present invention relates generally to the field of computer security, and more particularly, to a method and apparatus for securely storing data in a database.

2. Description of the Related Art

Identity theft is a $40 Billion a year problem in the United States. Identity thieves generally steal numbers such as bank account numbers, dates of birth, social security numbers, check numbers and credit card numbers. Thieves steal what is easiest to take. More specifically, a common form of identity theft takes place when thieves gain access to databases containing confidential information. When those databases are either unencrypted or have a weak or known encryption algorithm, thieves can easily access such confidential information and commit identity fraud.

SUMMARY OF THE INVENTION

The present invention has been made to address at least the above problems and/or disadvantages and to provide at least the advantages described below. Accordingly, an aspect of the present invention relates to a method of securely storing data in and retrieving data from a database on a computer including a processor.

According to an aspect of the present invention, a method of securely storing data in a memory on a computer including a processor is provided. The method includes receiving unencrypted data; randomly selecting a key, wherein the key is a character of an alphabet of a data type of the unencrypted data; creating partially encrypted data by encrypting the unencrypted data by randomly mapping each character of the alphabet of the data type of the unencrypted data to a character of an alphabet of a data type of encrypted data, except each character of the unencrypted data matching the key is not encrypted; and storing the partially encrypted data in the memory.

According to an aspect of the present invention, a method retrieving securely stored data in a memory on a computer including a processor is provided. The method includes retrieving a key, wherein the key is a character of an alphabet of a data type of the unencrypted data from the memory; retrieving partially encrypted data from the memory; retrieving a mapping for mapping encrypted data to unencrypted data and vice versa from the memory; creating unencrypted data by unencrypting the partially encrypted data by mapping, using the mapping, each character of an alphabet of a data type of an encrypted portion of the partially encrypted data to a character of an alphabet of the data type of the unencrypted data, and not mapping each character of the partially encrypted data matching the key; and storing the unencrypted data in the memory.

According to another aspect of the present invention, a non-transitory computer-readable recording medium having embodied thereon a program for executing a method of securely storing data is provided. The method includes receiving unencrypted data; randomly selecting a key, wherein the key is a character of an alphabet of a data type of the unencrypted data; creating partially encrypted data by encrypting the unencrypted data by randomly mapping each character of the alphabet of the data type of the unencrypted data to a character of an alphabet of a data type of encrypted data, except each character of the unencrypted data matching the key is not encrypted; and storing the partially encrypted data in a memory.

BRIEF DESCRIPTION OF THE DRAWINGS

The above and other aspects, features and advantages of the present invention will be apparent from the following detailed description when taken in conjunction with the accompanying drawings, in which.

DETAILED DESCRIPTION OF EMBODIMENTS OF THE PRESENT INVENTION

Figure 1A:
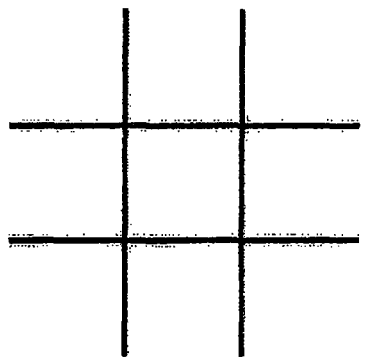
FIG. 1A is a diagram illustrating a tic-tac-toe board, according to an embodiment of the present invention.

Various embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 1B:
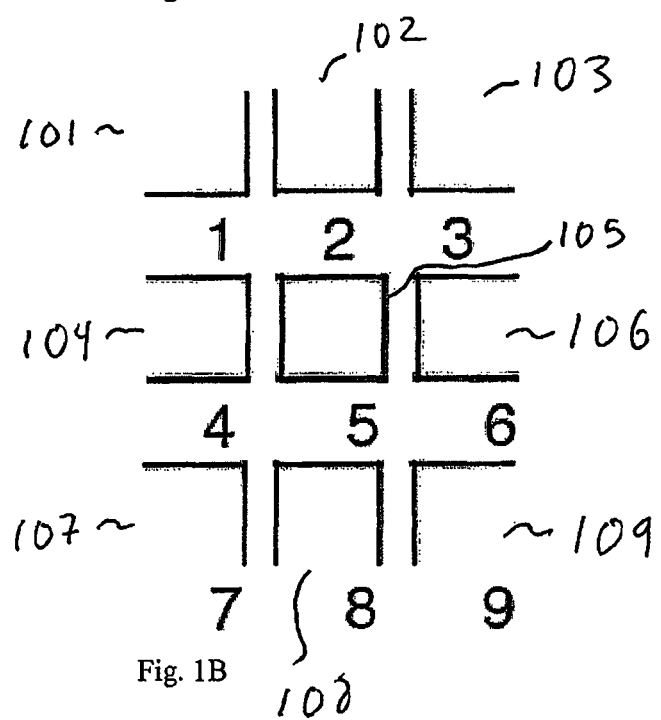
FIG. 1B is a diagram illustrating a deconstructed tic-tac-toe board mapped to numbers, according to an embodiment of the present invention.

FIG. 1A illustrates a tic-tac-toe board, according to an embodiment of the present invention. The tic-tac-toe board as illustrated in FIG. 1A is used as a method of encryption and decryption by treating each of the 9 parts of the board as a character. That is, the tic-tac-toe board is considered to include nine characters. FIG. 1B illustrates a deconstructed tic-tac-toe board. That is, the nine characters of a deconstructed tic-tac-toe board are a character including a right edge and a bottom edge of a square 101; a character including a left edge, the bottom edge and the right edge of the square 102; a character including the left edge and the bottom edge of the square 103; a character including a top edge, the right edge and the bottom edge of the square 104; a character including the square 105; a character including the top edge, the left edge and the bottom edge of the square 106; a character including the top edge and the right edge of the square 107; a character including the left edge, the top edge and the right edge of the square 108; and a character including the left edge and the top edge of the square 109.

FIG. 1B also illustrates an example of numbers 1-9 mapped to the above tic-tac-toe characters. Specifically, 1 is mapped to character 101, 2 is mapped to character 102, 3 is mapped to character 103, 4 is mapped to character 104, 5 is mapped to character 105, 6 is mapped to character 106, 7 is mapped to character 107, 8 is mapped to character 108 and 9 is mapped to character 109. Numbers 1-9 may be called unencrypted data. The unencrypted data need not be numbers and, instead, can be any character including symbols and letters or any other data type. Numbers are simply used as an example.

Figure 2A:
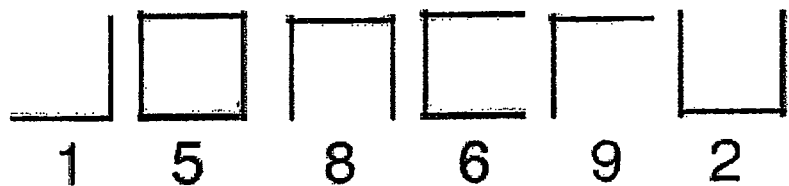
FIG. 2A is a diagram illustrating an numbers and their tic-tac-toe mappings, according to an embodiment of the present invention.

FIG. 2A illustrates numbers 1, 5, 8, 6, 9, and 2 being mapped to tic-tac-toe characters 101, 105, 108, 106, 109 and 102 of FIG. 1B, respectively, using the encryption scheme described above. Decryption is, of course, also possible using the same scheme. That is, given tic-tac-toe characters 101, 105, 108, 106, 109 and 102 of FIG. 1B, the numbers 1, 5, 8, 6, 9 and 2 can be retrieved and vice versa.

Using the above method of encryption, the 0 would not be encrypted. That is, 15806902 would be encrypted to tic-tac-toe character 101, tic-tac-toe character 105, tic-tac-toe character 108, 0, tic-tac-toe character 106, tic-tac-toe character 109, 0, and tic-tac-toe character 102. That is, for each occurrence of 0 in the numbers to be encrypted, the 0 remains as is. Thus, the "partially encrypted" result is a mixed string of tic-tac-toe characters and 0 (assuming 0 is one of the original numbers to be encrypted). The number (or more generally, a character of an alphabet of a data type of the unencrypted data) that will not be mapped to a tic-tac-toe character is called a "key." In this case, the key is 0.

According to another aspect of the present invention, instead of using 0 as the key, the key may be a different number, such as 2 or 4. Moreover, instead of always mapping 1 to tic-tac-toe character 101, 2 to tic-tac-toe character 102, etc., the mapping may be randomized.

Figure 2B:
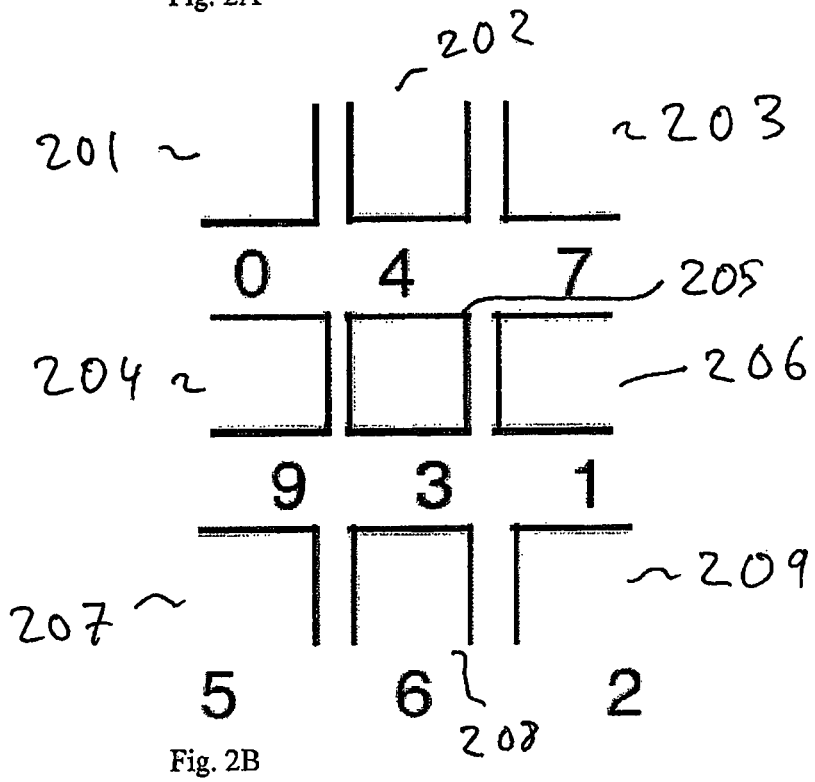
FIG. 2B is a diagram illustrating numbers and randomized tic-tac-toe mappings, according to an embodiment of the invention.

FIG. 2B illustrates a mapping using a key of 8, according to an embodiment of the present invention. In a mapping where 8 is used as the key, each time the number 8 is encountered in the unencrypted data (in this case, numbers 0-9), it is not converted to a tic-tac-toe character. Moreover, the mapping of numbers 0-9 to the tic-tac-toe characters is also randomized. Specifically, in this example, 1 is mapped to tic-tac-toe character 206, 2 is mapped to tic-tac-toe character 209, 3 is mapped to tic-tac-toe character 205, 4 is mapped to tic-tac-toe character 202, 5 is mapped to tic-tac-toe character 207, 6 is mapped to tic-tac-toe character 208, 7 is mapped to tic-tac-toe character 203, and 9 is mapped to tic-tac-toe character 204. Because 8 is the key, the number 8 is therefore not mapped to any tic-tac-toe character.

Figure 2C:
FIG. 2C is a diagram illustrating numbers and their tic-tac-toe mappings using randomized mappings, according to an embodiment of the present invention.
Figure 3:
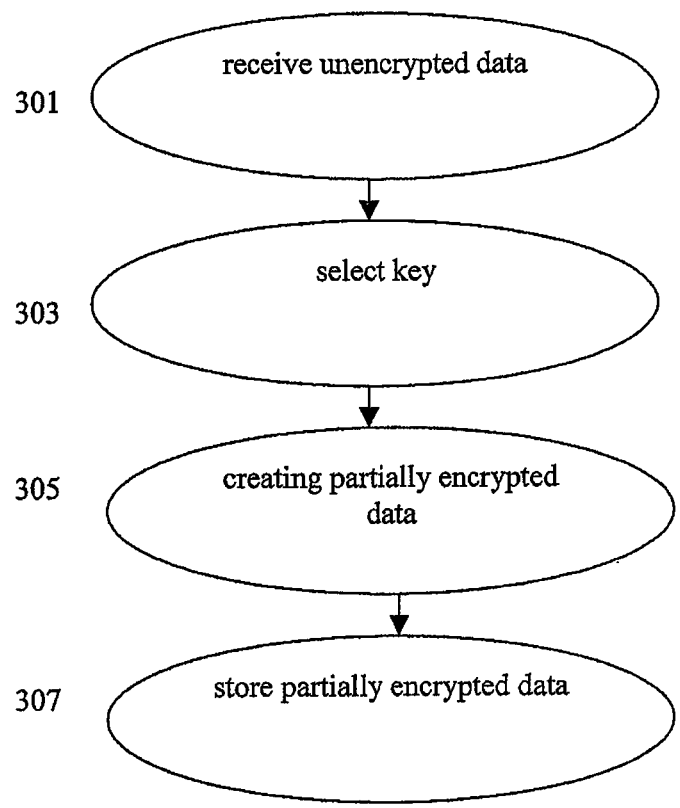
FIG. 3 is a diagram illustrating a flowchart of the encryption process, according to an embodiment of the present invention.
Figure 4:
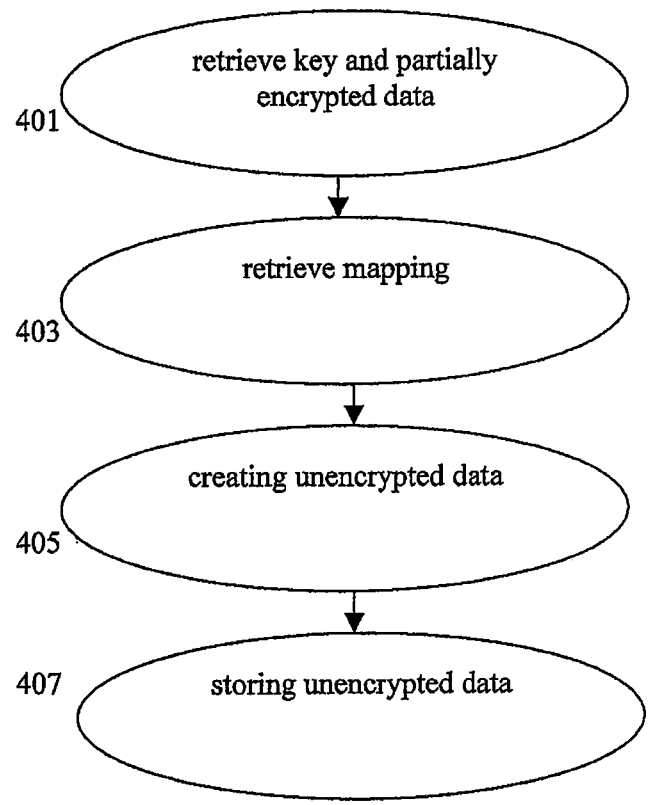
FIG. 4 is a diagram illustrating a flowchart of the decryption process, according to an embodiment of the present invention.

The process of encrypting unencrypted data 3864 is as follows. A computer including a processor and a memory receives unencrypted data in step 301. In this case, the number 3864 is received. The number may be entered by a user or may be read from a database or other parts of memory. The computer randomly selects a key, wherein the key is a character of an alphabet of a data type of the unencrypted data in step 303. Alternatively, the key may also be input by the user or stored in memory. In this example, the key is 8. The next step is creating partially encrypted data by encrypting the unencrypted data by randomly mapping each character of the alphabet of the data type of the unencrypted data to a character of an alphabet of a data type of encrypted data, except each character of the unencrypted data matching the key is not encrypted in step 305. That is, the numbers 3, 6 and 4 (the unencrypted data) use a random mapping stored in a memory of the computer (mapping illustrated in FIG. 2B), to map the numbers 3, 6, and 4 to tic-tac-toe characters 205, 202 and 208, respectively. Since the second character of the unencrypted data, 8, matches the key, 8, it does not get mapped to a tic-tac-toe character. Thus, the result is tic-tac-toe character 205, 8, tic-tac-toe character 208, and tic-tac-toe character 202, as illustrated in FIG. 2C. Finally, the result (the partially encrypted data) is stored in the memory in step 307.

The process to unencrypt tic-tac-toe character 205, 8, tic-tac-toe character 208, and tic-tac-toe character 202 is as follows. A memory on a computer including a processor retrieves a key, wherein the key is a character of an alphabet of a data type of the unencrypted data, and partially encrypted (tic-tac-toe character 205, 8, tic-tac-toe character 208, and tic-tac-toe character 202) data from the memory in step 401. A mapping for mapping encrypted data to unencrypted data and vice versa from the memory is retrieved (illustrated in FIG. 2B) in step 403. Next, the unencrypted data is created by unencrypting the partially encrypted data by mapping, using the mapping, each character of an alphabet of a data type of an encrypted portion of the partially encrypted data to a character of an alphabet of the data type of the unencrypted data, and not mapping each character of the partially encrypted data matching the key (tic-tac-toe character 205 is mapped to 3, 8 is the key and is not mapped, tic-tac-toe character 208 is mapped to 6 and tic-tac-toe character 202 is mapped to 4 as illustrated in FIG. 2C) in step 405. The unencrypted data is stored in the memory in step 407.

In the above example, the alphabet of the data type of the unencrypted data includes 0, 1, 2, 3, 4, 5, 6, 7, 8 and 9 the alphabet of the data type of the encrypted data includes a character including a right edge and a bottom edge of a square; a character including a left edge, the bottom edge and the right edge of the square; a character including the left edge and the bottom edge of the square; a character including a top edge, the right edge and the bottom edge of the square; a character including the square; a character including the top edge, the left edge and the bottom edge of the square; a character including the top edge and the right edge of the square; a character including the left edge, the top edge and the right edge of the square; and a character including the left edge and the top edge of the square. Each of the characters of the alphabet of the data type of the encrypted data may be represented as an image file. The key may be stored in memory; and the random mapping of the characters of the alphabet of the data type of the encrypted data to the characters of the alphabet of the data type of the unencrypted data may be stored in the memory. Finally, the memory may be a database and an application.

It will be apparent to those of ordinary skill in the art that embodiments of the present invention can be implemented in the form of hardware, software or a combination of hardware and software. Thus, embodiments of the present invention can be embodied as computer readable code on a computer readable recording medium. A computer readable recording medium may be any data storage device that can store data, which can be thereafter read by a computer system. Examples of computer readable recording mediums include Read-Only Memory (ROM), Random-Access Memory (RAM), Compact Disc (CD)-ROMs, magnetic tapes, floppy disks, optical data storage devices, flash memory, and the like. The computer readable recording medium can also be distributed over network coupled computer systems, such that the computer readable code is stored and executed in a distributed fashion.

While the present invention has been shown and described with reference to various embodiments and drawings of the portable terminal, it will be understood by those skilled in the art that various changes in form and details may be made therein without departing from the spirit and scope of the invention as defined by the appended claims and their equivalents.

What is claimed is:

1. A method of securely storing data in a memory on a computer including a processor, the method comprising:
   receiving unencrypted data;
   randomly selecting a key, wherein the key is a character of an alphabet of a data type of the unencrypted data;

creating partially encrypted data by encrypting the unencrypted data by randomly mapping each character of the alphabet of the data type of the unencrypted data to a character of an alphabet of a data type of encrypted data, except each character of the unencrypted data matching the key is not encrypted; and storing the partially encrypted data in the memory, wherein the alphabet of the data type of the encrypted data comprises:

a character including a right edge and a bottom edge of a square;

a character including a left edge, the bottom edge and the right edge of the square;

a character including the left edge and the bottom edge of the square;

a character including a top edge, the right edge and the bottom edge of the square;

a character including the square;

a character including the top edge, the left edge and the bottom edge of the square;

a character including the top edge and the right edge of the square;

a character including the left edge, the top edge and the right edge of the square; and a character including the left edge and the top edge of the square, and wherein each of the characters of the alphabet of the data type of the encrypted data is represented as an image file.

2. The method of claim 1, wherein the alphabet of the data type of the unencrypted data comprises 0, 1, 2, 3, 4, 5, 6, 7, 8 and 9.

3. The method of claim 1, wherein each of the characters of the alphabet of the data type of the encrypted data do not include any of the characters of the alphabet of the data type of the unencrypted data.

4. The method of claim 1, further comprising:

storing the key in the memory; and storing the random mapping of the characters of the alphabet of the data type of the encrypted data to the characters of the alphabet of the data type of the unencrypted data in the memory.

5. The method of claim 1, wherein the memory is at least one of a database and an application.

6. A method of retrieving securely stored data in a memory on a computer including a processor, the method comprising:

retrieving a key, wherein the key is a character of an alphabet of a data type of unencrypted data from the memory;

retrieving partially encrypted data from the memory;

retrieving a mapping for mapping encrypted data to unencrypted data and vice versa from the memory;

creating unencrypted data by unencrypting the partially encrypted data by mapping, using the mapping, each character of an alphabet of a data type of an encrypted portion of the partially encrypted data to a character of an alphabet of the data type of the unencrypted data, and not mapping each character of the partially encrypted data matching the key; and storing the unencrypted data in the memory, wherein the alphabet of the data type of the encrypted data comprises:

a character including a right edge and a bottom edge of a square;

a character including a left edge, the bottom edge and the right edge of the square;

a character including the left edge and the bottom edge of the square;

a character including a top edge, the right edge and the bottom edge of the square;

a character including the square;

a character including the top edge, the left edge and the bottom edge of the square;

a character including the top edge and the right edge of the square;

a character including the left edge, the top edge and the right edge of the square; and a character including the left edge and the top edge of the square, and wherein each of the characters of the alphabet of the data type of the encrypted data is represented as an image file.

7. The method of claim 6, wherein the alphabet of the data type of the unencrypted data comprises 0, 1, 2, 3, 4, 5, 6, 7, 8 and 9.

8. The method of claim 6, wherein each of the characters of the alphabet of the data type of the encrypted data do not include any of the characters of the alphabet of the data type of the unencrypted data.

9. The method of claim 6, further comprising:

storing the key in the memory; and storing the random mapping of the characters of the alphabet of the data type of the encrypted data to the characters of the alphabet of the data type of the unencrypted data in the memory.

10. The method of claim 6, wherein the memory is at least one of a database and an application.

11. A non-transitory computer-readable recording medium having embodied thereon a program for executing a method of securely storing data, the method comprising:

receiving unencrypted data;

randomly selecting a key, wherein the key is a character of an alphabet of a data type of the unencrypted data;

creating partially encrypted data by encrypting the unencrypted data by randomly mapping each character of the alphabet of the data type of the unencrypted data to a character of an alphabet of a data type of encrypted data, except each character of the unencrypted data matching the key is not encrypted; and storing the partially encrypted data in a memory, wherein the alphabet of the data type of the encrypted data comprises:

a character including a right edge and a bottom edge of a square;

a character including a left edge, the bottom edge and the right edge of the square;

a character including the left edge and the bottom edge of the square;

a character including a top edge, the right edge and the bottom edge of the square;

a character including the square;

a character including the top edge, the left edge and the bottom edge of the square;

a character including the top edge and the right edge of the square;

a character including the left edge, the top edge and the right edge of the square; and a character including the left edge and the top edge of the square, and wherein each of the characters of the alphabet of the data type of the encrypted data is represented as an image file.

\* \* \* \* \*